United States Patent Office 3,323,524
Patented June 6, 1967

3,323,524
EXTRACTION PROCESS FOR NON-TOBACCO LEAVES
Raymond J. Shamberger, Jr., P.O. Box 70,
Orchard Park, N.Y. 14127
No Drawing. Filed Sept. 20, 1965, Ser. No. 488,718
3 Claims. (Cl. 131—2)

In general, this invention modifies the properties of vegetable and other non-tobacco leaves by subjecting these leaves to a series of chemical extractions which strip the whole leaf or shredded leaves to almost pure cellulose. This extraction process removes unhealthful substances and improves the flavor and aroma of these leaves when used as a smoking product. The extracted leaf is reconstituted by adding back non-toxic chemical agents which enhance the burning qualities, flavor and aroma.

In recent years increasing statistical evidence has associated cigarette smoking with increased death rates from lung cancer and other diseases, notably coronary heart disease, emphysema and chronic bronchitis. Recently, an advisory committee to the Surgeon General has established a casual relationship between cigarette smoking and lung disease.

Nearly 500 different chemical compounds have been isolated from cigarette condensate among which are numerous polycyclic, aromatic, other organic and inorganic compounds. Many of these compounds are carcinogenic and toxic when bioassayed on animals. Benzo(a)pyrene, one of the most potent carcinogens known, when applied to mouse skin at concentrations as low as .001% will induce caricinoma. Other active polycyclic compounds in cigarette smoke condensate include dibenzo(a,l)pyrene, dibenzo(a,h)anthracene, benzo(i)phenantrene, dibenz(a,j)acridine, dibenz(a,h)acridine, benzo(j)fluoroanthene, benzo(b)fluoranthene, chrysene and benzo(e)pyrene.

The carcinogenic mechanism may occur in either one or two stages. Some compounds alone may produce skin tumors in animals. These compounds are designated complete carcinogens. The second mechanism by which tumors are formed requires an exposure to a carcinogen (initiator) in low concentration followed by exposure to a second non-specific carcinogen. The second carcinogen is designated as a promotor or as a co-carcinogen. Polycyclics generally initiate the carcinogenic process and several polycyclic hydrocarbons are complete carcinogens. Polycyclics are formed during the burning process from materials inherent in the leaf. Incomplete pyrolysis of sterols may produce polycyclics, see "Smoking and Health," Report of the Advisory Committee to the Surgeon General of the Public Health Service, Public Health Service Publication No. 1103, page 52 (1964). An extraction process would remove the sterols and other possible precursors of polycyclics. Recent evidence indicates polonium[210] may also initiate the carcinogenic process, see E. Radford and V. Hunt, Polonium-210: A Volatile Radioelement in Cigarettes," Science 143, 247–249 (1964). Polonium[210] may also be removed by an efficient extraction process.

The polycyclic fractions from cigarette smoke condensate account for less than 10% of the carcinogenic activity of cigarette tar. Over 90% of the carcinogenic activity in the smoke condensate is thought to be due to co-carcinogenic compounds. Co-carcinogens have been demonstrated in alkaline extracts of unburned tobacco, see F. Bock, G. Moore and S. Crouch, "Tumor-Promoting Activity of Extracts of Unburned Tobacco, Science 145, 831–833 (1964). Phenols, long chain fatty acid esters and free fatty acids are considered co-carcinogenic agents by most leading cancer investigators. These substances are all abundant in smoke condensate. Other types of substances yet unidentified may also be promoting substances.

The burning process releases co-carcinogens in the smoke by either "dry distillation" or by incomplete destruction of usually non-carcinogenic compounds. Dry distillation is release of substances because of high temperatures near the burning zone of an ignited cigarette. These substances are simply distilled and are not chemically changed. Substances which dry distill can be easily removed in a thorough extraction process. A second way co-carcinogens arise is incomplete pyrolysis of materials inherent in the leaf. Rearrangements and partial destruction may change usually non-carcinogenic compounds into carcinogens. A good extrcation process should remove most of the precursors of co-carcinogens.

A thorough extraction process will also remove toxic substances which are released by dry distillation. Amino acids, other nitrogen compounds, and sulfur compounds are almost completely extracted. Therefore, little or no nitrogen or sulfur will appear in the smoke. Toxic compounds containing nitrogen or sulfur such as nitrogen dioxide, methyl nitrite, hydrogen cyanide and hydrogen sulfide should not appear. Other toxic compounds such as formaldehyde, acetaldehyde and acrolein will be markedly reduced.

The taste and aroma of non-tobacco cigarettes are generally objectionable. An extraction process will remove compounds responsible for many bad tastes and aromas. Various desirable flavors, hydroscopic agents may be added to the shredded or whole extracted leaf to improve the taste and odor of non-tobacco cigarettes. Flavoring mixtures may consist of cocoa, saccharin, deer tongue (i.e., powdered leaves of *Irilisa odoratissima*), St. John's bread (i.e., ground meal from the ripe fruit of *Ceratonica siliqua*), powdered licorice, rum glycerol, invert sugar, honey, pineapple extract, tonka bean extract, anise seed extract, potassium nitrate, molasses, gum arabic, gum tragacanth and various essential oils.

The extraction process may be applied to many types of leaves. These include: elm, oak, banana, soy beans, catalpa, papaya, tulip tree, sassafras, coconut palm, cottonwood, ash, sweetgum, lettuce cabbage, corn, peanut, maple, spinach, beech, chestnut, walnut, sycamore, basswood, watermelon, squash, radish, sugar beet, bean, cucumber, cauliflower, turnip, parsnip, sweet potato, geranium, sunflower, melon, birch and potato.

Extraction process

Whole leaves or shredded whole leaves are placed in stainless steel wire mesh baskets. These baskets may be made any size desired. These baskets are raised or lowered by means of a pulley into a stainless steel or polyethylene drum which contains the solvents. The solvents are heated by steam pipes which fit inside the drum.

The leaves are first rinsed with water at 40–60 degrees centigrade to remove dirt and many water soluble materials. The rinse step is repeated and the rinse solutions are discarded. After fresh water is added to the containers and heated to 40–60 degrees centigrade, sodium chlorite is added until the concentration of sodium chlorite is 1–2%. The pH is adjusted to about 4.0 with acetic acid. The basket containing the leaves is again lowered into the solution. For the next 30–50 minutes the stainless steel baskets are raised and lowered frequently. This agitation is necessary for thorough extraction. After removing the bleach solution the polyethylene drums containing the baskets are filled with water twice and drained. Both rinsing solutions are discarded. The baskets are raised from the drums. Acetone is added and heated to 40–65 degrees centigrade. After 30–50 minutes of extraction in the heated acetone, the stainless steel baskets are finally raised from the drums and allowed to drain. The whole leaves or shredded leaves are removed from the baskets and dried. The whole leaves may be dipped in various commercial mixtures or the shredded leaves may be sprayed with mixtures already previously described.

I claim:

1. A process for the production of an essentially cellulosic smoking material made from non-tobacco vegetable leaves selected from the group consisting of cabbage, lettuce, elm, oak, banana, soy beans, catalpa, birch, papaya, tulip tree, sassafras, coconut palm, cottonwood, white ash, sweetgum, corn, peanut, spinach, maple, beech, chestnut, walnut, sycamore, basswood, watermelon, squash, radish, sugar beet, bean, cucumber, cauliflower, turnip, parsnip, sweet potato, geranium, sunflower and potato, said process involving the extraction of the selected leaves with water at 40°–60° C., bleaching of the water extracted leaves at 40°–60° C., rinsing to remove the excess bleach, and a final extraction with an organic solvent heated to between 40°–65° C., the said smoking material being characterized by a very low residual amount of nitrogen and sulphur compounds, phenols, hydrogen cyanide, fatty acids and sterols.

2. The process of claim 1 in which the specific organic solvent used in the extraction is selected from the group consisting of acetone and ethylmethyl ketone.

3. The process of claim 1 in which the said extracted smoking material is reconstituted with non-toxic additive materials designed to enhance the burning qualities, flavor and aroma, the said additives being low in nitrogen and sulphur.

References Cited

UNITED STATES PATENTS

| | | | |
|---|---|---|---|
| 1,577,768 | 3/1926 | Smith. | |
| 2,576,021 | 11/1951 | Koree | 131—2 |
| 2,930,720 | 3/1960 | Finberg | 131—17 |
| 3,003,895 | 10/1961 | Grunwald | 131—17 |
| 3,106,209 | 10/1963 | Torigian | 131—2 |
| 3,112,754 | 12/1963 | Diaz | 131—2 |
| 3,255,760 | 6/1966 | Selke | 131—8 |

FOREIGN PATENTS 1,379,831  10/1964  France.

OTHER REFERENCES

Shmuk: (Text) The Chemistry and Technology of Tobacco, published by Pishdrepromizdat, Moscow, 1953, and by the National Science Foundation and Dept. of Agriculture (1861), pages 588, 602 and 603.

SAMUEL KOREN, *Primary Examiner.*

MELVIN D. REIN, *Examiner.*